Dec. 29, 1925.
G. A. WILSON ET AL
1,567,313
SEPARATOR FOR GAS, OIL, WATER, AND SAND
Filed Sept. 6, 1921
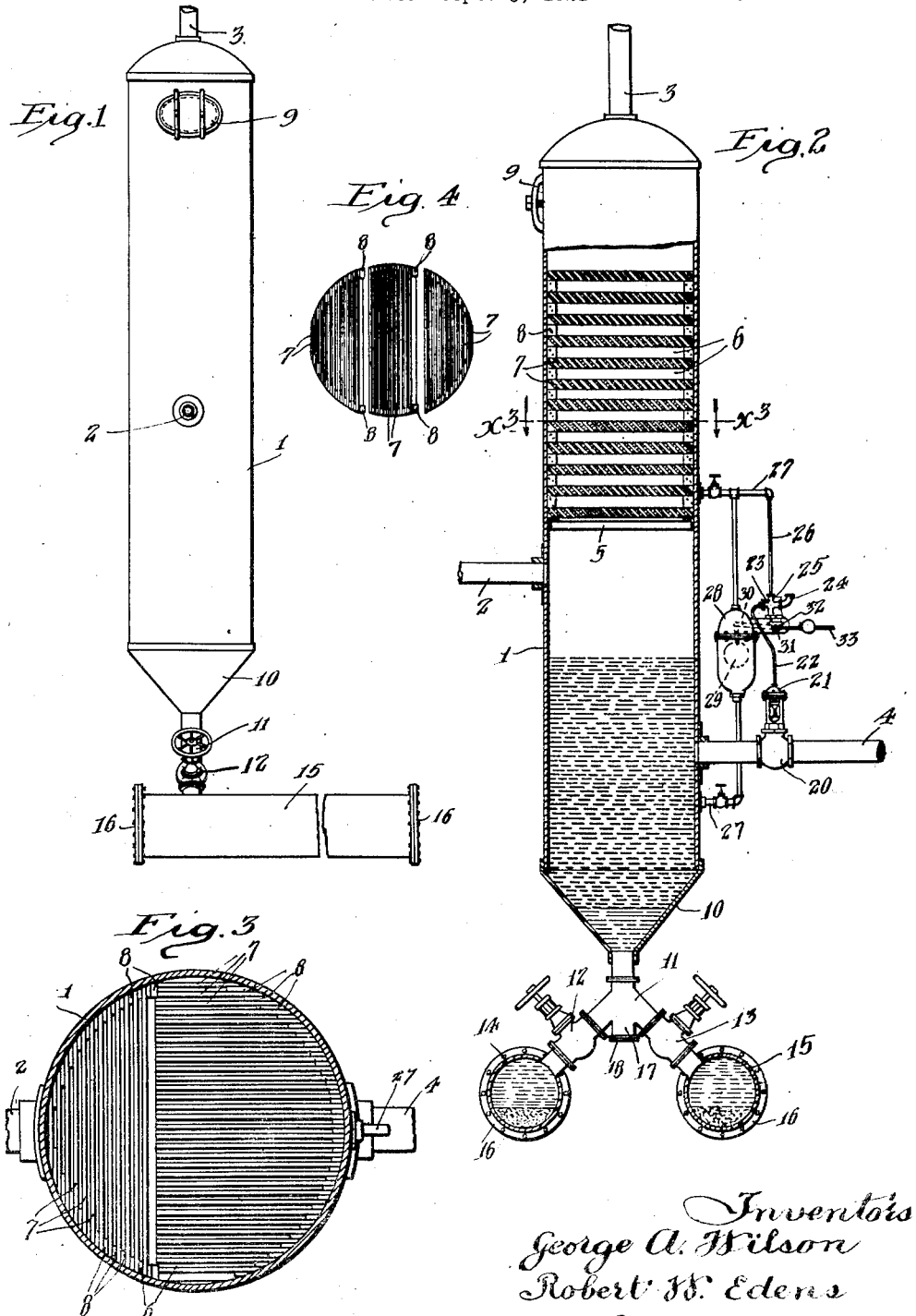
Inventors
George A. Wilson
Robert H. Edens
By Lyon & Lyon
attys Patented Dec. 29, 1925.

1,567,313

UNITED STATES PATENT OFFICE.

GEORGE A. WILSON, OF HUNTINGTON BEACH, AND ROBERT W. EDENS, OF LOS ANGELES, CALIFORNIA.

SEPARATOR FOR GAS, OIL, WATER, AND SAND.

Application filed September 6, 1921. Serial No. 498,797.

*To all whom it may concern:*

Be it known that we, GEORGE A. WILSON and ROBERT W. EDENS, citizens of the United States, and residents of Huntington Beach, in the county of Orange, and Los Angeles, in the county of Los Angeles, respectively, in the State of California, have invented certain new and useful Improvements in Separators for Gas, Oil, Water, and Sand, of which the following is a specification.

This invention relates generally to that class of separators which are used in connection with oil and gas wells for the purpose of effecting a separation of the gas, oil, water and sand usually found in mechanical combination in the product pumped from such wells.

An object of the invention is to provide a separator effecting a more perfect separation of the gas.

Another object is to provide a separator which will prevent oil vapors being discharged with the separated gas.

Another object is to provide a separator in which the sand and water settling out from the oil can be manually removed without interruption of the continuous operation of the separator.

A further object is to provide a separator having a plurality of sand and water receivers into which the sand and water settling out from the oil may be alternately directed so that one thereof may be emptied while the other is functioning to receive the separated sand and water.

Various other objects and advantages will be more fully apparent from the following description of the accompanying drawings, which form a part of this disclosure and which illustrate a preferred embodiment of the invention.

Of the drawings,

Figure 1 is an elevation of the separator;

Figure 2 is a vertical section;

Figure 3 is a plan section on line $x^3$—$x^3$ of Figure 2;

Figure 4 is a detail plan view of one of the sectional baffle grids.

In the drawings, 1 designates a separator tank, preferably of a vertical cylindrical form, having an inlet 2 through which crude oil, gas and whatever water and sand it may contain is delivered into the tank, a gas outlet 3 for conducting the separated gas from the top portion of the tank, and an oil outlet 4, below the inlet 2, for conducting the separated oil from the tank.

A ledge 5 formed of an angle iron attached to the wall of the tank above the inlet 2 supports a series of horizontal baffle grids 6 disposed one upon the other, each grid being formed of transverse slats 7 angularly disposed as shown in Figure 2 and relatively spaced by spacing blocks 8 with the slats and blocks joined together as a unit. Each grid is preferably made in three sections as shown in Figure 4, so they may be conveniently inserted into the tank through a man-hole 9. The grids are positioned in the tank so that the slats of each cross the slats of the adjacent grids at right angles, as indicated in Figure 3 of the drawings. This grid structure divides the upper portion of the tank into a multitude of relatively small zig-zag passages through which the gas must pass before its exit from the tank.

The tank has a cone-shaped base or lower head 10 communicating with a Y-cross fitting 11, the opposite Y-branches of said fitting communicating with respective valves 12, 13 with the valves in turn communicating with sand or sediment receptacles 14, 15, which are preferably constructed of lengths of flanged pipe having their ends closed by removable cover plates 16. The branch 17 of the fitting 11 has a closure 18 and affords a convenient access to the fitting for cleaning.

The outlet 4 is provided with a float controlled balance valve 20 which is of the standard "Fulton-Chapin" type and which is opened when the oil in the tank reaches a predetermined level, to permit a flow of the oil through the outlet 4, and is closed when the oil recedes below such predetermined level.

Briefly described, this float controlled valve mechanism includes the valve 20 which is operated by a diaphragm in the diaphragm chamber 21 and said chamber has a pressure pipe 22 leading to a control valve 23. Said control valve has a branch 24 open to the atmosphere and a branch 25 communicating with a pipe 26 connecting with a pipe line 27. The pipe line 27 communicates at opposite ends with the tank above and below the oil level and has an intermediate float chamber 28. A float 29 in said float chamber is carried by an arm 30 fixed to a shaft 31 extended outwardly and carrying a shoe 32 and a weighted arm 33, with the weight slidable for regulation. The shoe contacts with and operates the stem of the valve 23. When the float is up the valve establishes communication between the pipe 26 and the pipe 22 and the pressure in the tank operating the diaphragm closes the valve 20, and when the float is down the valve 23 closes communication with the pipe 26 and opens communication between the pipe 22 and the branch 24 of the valve 23 which releases the pressure from the diaphragm to the atmosphere, allowing the valve 20 to open. Further detailed description of this well known form of float-controlled valve mechanism would herein be superfluous, as it will be evident that in so far as the present invention is concerned any of the many well known types of float valve may be employed.

In use the separator above described operates as follows: Oil, gas and such water and sand as may be entrained therewith are delivered into the separator through the inlet 2, which is usually directly connected to the well. In the tank the constituents of the well output are separated in conformity with their respective specific gravities. The gas rises through the relatively small zig-zag passages in the baffle grids and into the top portion of the tank from which it exits through the gas outlet 3, and the sand being of highest specific gravity drops to the bottom of the tank, through one of the valves 12, 13 and into the companion receptacle 14, 15 as the case may be. The water being of next relative specific gravity settles in a layer on top of the sand and the oil being of next relative specific gravity, settles in a layer on top of the water.

As the column of gas rises through the relatively small zig-zag passages through the stack of baffle grids it will be broken up into a multiplicity of small streams and any oil vapors entrained therewith will collect upon the slats of the grids and will drop therefrom into the oil in the tank. By this means it is assured that only a perfectly dry gas will be carried from the tank through the outlet 3.

In previous devices in which the sand collects in the bottom of the tank to be removed through a relatively small opening it has been found that the sand would pack to such an extent that it offered great difficulty of removal even by the use of various probes and tools. The operation of such devices has to be discontinued during such removal of the sand with a resultant loss in the output of the well.

In the present invention we have provided a construction by which a removal of the collected sand and sediment may be conveniently effected without interruption to the continuous functioning of the separator. In the operation of our improved construction one of the valves, for instance, the valve 12, is closed, and the opposite valve 13 opened so that the separated sand and water will flow downward into the receptacle 15. After the separator has been in operation for a time and it is desired to remove the sand and sediment, the valve 13 is closed and the valve 12 is opened to direct the sand subsequently separated into the receptacle 14. The end plates 16 of the receptacle may now be removed and the sand and sediment therein conveniently removed and the covers replaced.

We claim:

1. In a device of the character described, a tank having a gas outlet communicating with its upper portion, an oil outlet communicating with its lower portion, and located at a level to withdraw only oil, an intermediate inlet for the oil, gas, and water, a plurality of sediment receptacles each communicating with the lower end of the tank, and valve means controlling communication between each receptacle and the tank.

2. In a device of the character described, a tank having a gas outlet communicating with its upper portion, an oil outlet communicating with its lower portion, and located at a level to withdraw only oil, an intermediate inlet for the oil, gas, and water, a fitting communicating with the lower end of the tank and having a plurality of separate branches, a valve connected with each of said branches, and a sediment receptacle connected with each valve.

3. In a device of the character specified in claim 1, the sediment receptacles being each constructed of horizontal pipe sections having cover plates detachably secured to their opposite ends.

4. In a device of the character specified in claim 1, the receptacles having means removable to permit access thereto.

Signed at Los Angeles, California, this 31st day of August, 1921.

GEORGE A. WILSON.
ROBERT W. EDENS.